(12) United States Patent
Kanitsar et al.

(10) Patent No.: US 8,705,821 B2
(45) Date of Patent: Apr. 22, 2014

(54) METHOD AND APPARATUS FOR MULTIMODAL VISUALIZATION OF VOLUME DATA SETS

(75) Inventors: Armin Kanitsar, Vienna (AT); Martin Haidacher, Rauris (AT); Stefan Bruckner, Vienna (AT); Eduard Groeller, Vienna (AT)

(73) Assignee: Agfa HealthCare NV, Mortsel (BE)

( * ) Notice: Subject to any disclaimer, the term of this patent is extended or adjusted under 35 U.S.C. 154(b) by 329 days.

(21) Appl. No.: 13/002,042

(22) PCT Filed: Jun. 19, 2009

(86) PCT No.: PCT/EP2009/057664
§ 371 (c)(1),
(2), (4) Date: Dec. 29, 2010

(87) PCT Pub. No.: WO2010/003804
PCT Pub. Date: Jan. 14, 2010

(65) Prior Publication Data
US 2012/0038649 A1    Feb. 16, 2012

(30) Foreign Application Priority Data
Jul. 11, 2008  (EP) .................................... 08160164

(51) Int. Cl.
*G06K 9/00*    (2006.01)
(52) U.S. Cl.
USPC ............................... 382/128; 128/922; 378/4
(58) Field of Classification Search
USPC ............... 382/100, 128, 129, 130, 131, 132; 128/922; 378/4–27
See application file for complete search history.

(56) References Cited

U.S. PATENT DOCUMENTS

| 5,961,454 A | 10/1999 | Kooy et al. |
| 2006/0030768 A1 | 2/2006 | Ramamurthy et al. |

FOREIGN PATENT DOCUMENTS

WO    03/077202 A1    9/2003

OTHER PUBLICATIONS

Kim, J. et al., "Visualizing Dual-Modality Rendered Volumes Using a Dual-Lookup Table Transfer Function," Computing in Science and Engineering, vol. 9, No. 1, pp. 20-25, 2007.*
Akiba, H. et al., "A Tri-Space Visualization Interface for Analyzing Time-Varying Multivariate Volume Data," Eurographics/IEEE-VGTC Symposium on Visualization, pp. 115-122, 2007.

(Continued)

*Primary Examiner* — Anand Bhatnagar
(74) *Attorney, Agent, or Firm* — Keating & Bennett, LLP

(57) ABSTRACT

The invention relates to a method and a corresponding apparatus for multimodal visualization of volume data sets of an object, in particular a patient, comprising the following steps: acquiring a first volume data set of the object with a first imaging modality and a second volume data set of the object with a second imaging modality, said first and second volume data set each comprising a plurality of sample points and values ($f_1, f_2$) associated with said sample points, establishing a transfer function, said transfer function defining optical properties ($c, \alpha$) of certain values ($f_1, f_2$) of said first and second volume data set, and visualizing the optical properties ($c, \alpha$) of said certain values ($f_1, f_2$) of said first and second volume data set. In order to reduce the complexity of finding a good transfer function so that a transfer function can be defined by the user in an intuitive and familiar way, the transfer function is established by using information ($I(f_1), I(f_2)$) contained in a distribution ($P(f_1), P(f_2)$) of values ($f_1, f_2$) of said first and second volume data set.

23 Claims, 8 Drawing Sheets

(56) References Cited

OTHER PUBLICATIONS

Cai, W. et al., "Data Intermixing and Multi-Volume Rendering," Computer Graphics Forum, vol. 18, pp. 359-368, 1999.

Evans, A. et al., "MRI-PET Correlation in Three Dimensions using a volume-of-interest (VOI) atlas," Journal of Cerebral Blood Flow and Metabolism, vol. 11, No. 2, pp. A69-A78, 1991.

Hong, H. et al., "Efficient Multimodality Volume Fusion Using Graphics Hardware," International Conference on Computational Science, vol. 3516, pp. 842-845, 2005.

Kindlmann, G. et al., "Semi-Automatic Generation of Transfer Functions for Direct Volume Rendering," Proceedings of the IEEE Symposium on Volume Visualization, pp. 79-86, 1998.

Kniss, J. et al., "Gaussian Transfer Functions for Multi-Field Volume Visualization," VIS '03: Proceedings of the 14th IEEE Visualization 2003, pp. 65-72.

Kniss, J. et al., "Interactive Volume Rendering Using Multi-Dimensional Transfer Functions and Direct Manipulation Widgets," VIS '01: Proceedings of the 12th IEEE Visualization 2001, pp. 255-262.

Kniss, J. et al., "Medical Applications of Multi-Field Volume Rendering and VR Techniques," Proceedings of Eurographics/IEEE VGTC Symposium on Visualization, pp. 249-254, 2004.

Kniss, J. et al., "Volume Rendering Multivariate Data to Visualize Meteorological Simulations: A Case Study," VISSYM '02: Proceedings of the Symposium on Data Visualization 2002, pp. 189-195.

Levin, D. et al., "The Brain: Integrated Three-dimensional Display of MR and PET Images," Radiology, vol. 172, pp. 783-789, 1989.

Levoy, M., "Display of Surfaces from Volume Data," IEEE Computer Graphics and Applications, vol. 8. No. 3, pp. 29-37, 1988.

Li, H. et al., "Multisensor Image Fusion Using the Wavelet Transform," Graphical Models and Image Processing, vol. 57, No. 3, pp. 235-245, 1995.

Pfister, H. et al., "The Transfer Function Bake-Off," VIS '00: Proceedings of the 11th IEEE Visualization 2000, pp. 523-526.

Schad, L. et al., "Three Dimensional Image Correlation of CT, MR, and PET Studies in Radiotherapy Treatment Planning of Brain Tumors," Journal of Computer Assisted Tomography, vol. 11, No. 6, pp. 948-954, 1987.

Shannon, E.C., "A Mathematical Theory of Communication," Bell System Technical Journal, vol. 27, pp. 379-423 and 623-656, 1948.

Stokking, R. et al., "SPECT/MRI Visualization for Frontal Lobe Damaged Regions," Visualization in Biomedical Computing 1994, vol. 2359, No. 1, pp. 282-290.

Toet, A., "Hierarchical Image Fusion," Machine Vision and Applications, vol. 3, No. 1, pp. 1-11, 1990.

Weiss, K. et al. "Hybrid Color MR Imaging Display," American Journal of Roentgenology, vol. 149, No. 4, pp. 825-829, 1987.

Wells III, W.M. et al., "Multi-modal Volume registration by maximization of mutual information," Medical Image Analysis, vol. 1, No. 1, pp. 35-51, 1996.

Zuiderveld, K.J. et al., "Multi-modal Volume Visualization using Object-Oriented Methods," VVS '94: Proceedings of the 1994 IEEE Symposium on Volume Visualization, pp. 59-66.

International Search Report, mailed May 6, 2010, from counterpart International Application No. PCT/EP2009/057664, filed Jun. 19, 2009.

International Preliminary Report on Patentability, issued Jan. 11, 2011, from counterpart International Application No. PCT/EP2009/057664, filed Jun. 19, 2009.

\* cited by examiner (a) 3D transfer function space  (b) 2D transfer function space and $\delta$ windowing function (a) Without usage of δ windowing function (b) With usage of δ windowing function (a) CT slice (b) MRI slice (c) Multimodal visualization of a CT and MRI data set

METHOD AND APPARATUS FOR MULTIMODAL VISUALIZATION OF VOLUME DATA SETS

The invention relates to a method and an apparatus for multimodal visualization of volume data sets of an object, in particular a patient, according to the preamble of the independent claims.

Volume visualization is a technique which enables physicians and scientists an insight into complex volumetric structures. In medical applications this helps to provide a diagnosis. Volume data sets acquired with different imaging modalities are used for different examinations. Currently, the trend towards information acquisition using data sets from multiple modalities is increasing in order to facilitate better medical diagnosis.

As different modalities frequently carry complementary information, it is intended to combine their strengths providing the user with a consistent interface. The different imaging modalities can be divided into two groups: modalities which show anatomical structures and modalities which show functional features. Computed Tomography (CT) and Magnetic Resonance Imaging (MRI) are examples for modalities which show anatomical structures. In contrast to these, e.g., Positron Emission Tomography (PET) shows functional features of the body. In general, the spatial resolution of anatomical modalities is better than for functional modalities. Therefore a common combination of modalities is between anatomical and functional modalities. The functional modality provides the information about the processes inside the body and the anatomical modality is used to show the inner structure of the body. Also the combination of two anatomical modalities like CT and MRI is often used for diagnosis. Both of them show the inner structure of the body but have different contrast for different tissues. The brain, e.g., has a higher contrast in MRI whereas bones can be seen in CT. Normally a side-by-side view is provided in medical applications for the inspection of the different modalities. A physician can simultaneously scroll through both registered modalities.

This practice has two main drawbacks. One drawback is the failing of a direct visual combination of the data. A physician has to mentally overlap the two images to get the corresponding points of one modality in the other one. A second drawback is the restriction to a 2D visualization because in 3D it would be difficult to find corresponding regions in both data sets. These drawbacks can be eliminated by the direct fused display of both data sets together in a multimodal visualization.

The problem with such a multimodal visualization is the density of information in space. For each sample point, there is one value for each modality. Even for volume visualization of a single modality, it is hard to handle the dense information. Two steps are necessary in order to get an expressive visualization. First representative sample points are classified to reduce the density. In a second step the values have to be mapped to optical properties which can be displayed. Both of these steps can be done at once by a transfer function. It defines optical properties, such as color and opacity, for certain values. The transfer function can be controlled by the user to change the appearance of the result image. The more input values are taken to classify a sample point and assign optical properties to it, the harder it is for the user to find a good transfer function.

This is a main problem of multimodal visualization because there are at least two values involved. Additional derived quantities further increase the dimensionality of the transfer function domain.

The origin of multimodal volume visualization can be found in computer vision. In this research field techniques have been used for decades to generate a fused image out of two individual images from the same scene. The simplest image fusion method is to take the average of two input images. The penalty of this method is a reduction in contrast. To solve this problem Toet [18] introduced a fusion technique based on the Laplacian pyramid. One of the improvements of this technique, based on wavelet transforms, was introduced by Li et al. [13]. In general the goal of all image fusion techniques is to generate a fused result image which contains the most relevant parts of both images without redundant information.

For multimodal visualization the techniques from image fusion cannot be used directly because each change in one of the input images would result in the generation of new pyramids. So a small change in one of the transfer functions of one modality would require a new fusion. This would take too long to use this technique for an interactive visualization. Therefore different techniques for multimodal visualization have been developed.

All these methods for multimodal visualization can be classified—as described by Cai and Sakas [2]—according to the level in the rendering pipeline in which they are applied. In the illumination-model-level intermixing optical properties are assigned to a combination of values from the different modalities. The accumulation-level intermixing fuses the values after optical properties are assigned to each modality individually. In the image-level intermixing the fusion is done after a 2D image has been rendered for each modality.

The image-level intermixing is the simplest way for the fusion of two modalities, but it has the disadvantage that the 3D information is lost. Therefore this fusion technique is typically just applied on single slices of the volume. Several techniques have been developed for this purpose, such as alternate pixel display, linked cursor, and color integration procedures [15, 17, 19].

Due to the increasing speed of computers and graphics hardware volume rendering became more popular and, therefore, also the multimodal fusion could be done in the volume space. The first methods were based on surface models. Levin et al. [11] generated a surface model from an MRI scan and mapped the PET-derived measurement onto this surface. Evans et al. [3] generated an integrated volume visualization from the combination of MRI and PET. The mentioned and other works focused mainly on the combination of anatomical and functional images. A more general approach for the fusion of all combinations of modalities was introduced by Zuiderveld and Viergever [21]. For this method an additional segmentation of the volumes is necessary to decide which one to show at a given sample point. A more recent work by Hong et al. [4] describes how fusion techniques in this intermixing level can be efficiently implemented using the graphics hardware.

More sophisticated but more complex methods for multimodal visualization are directly applied in the illumination-model-level. The intermixing in this level directly generates optical properties from the combination of the values and additional properties of the two volumes at a single sample point. A case study for the rendering of multivariate data where multiple values are present at each sample point was done by Kniss et al. [7]. In this work the idea of multi-dimensional transfer functions to assign optical properties to a combination of values was used. Akiba and Ma [1] used parallel coordinates for the visualization of time-varying multivariate volume data. Multimodal visualization of medical data sets by using multi-dimensional transfer functions was shown by Kniss et al. [10]. The classification is done on the basis of the dual histogram which is a combination of the values of one modality on one axis, and the values of the other modality on the other axis. The interpretation of a dual transfer function space based on this dual histogram is difficult because it is quite different to well-known histograms from a single modality. Therefore, it is also hard to find a good transfer function with trial-and-error. Kim et al. [5] presented a technique which simplifies the transfer function design by letting the user define a separate transfer function for each modality. The combination of them defines the two-dimensional transfer function. The problem with this technique is the loss of information by reducing the multi-dimensional transfer function to two 1D transfer functions.

As mentioned before, the assignment of optical properties in multimodal visualization is dependent on more than one value. When the whole information space is used then a multi-dimensional transfer function is needed. In general it is a non-trivial task to define a multi-dimensional transfer function because of its complexity. Nevertheless, multi-dimensional transfer functions are commonly used for volume visualization. 2D transfer functions were first introduced by Levoy [12]. In addition to the data value the gradient magnitude was used as second dimension to classify a sample point. Due to the fact that the design of a 2D transfer function is non-trivial, methods were developed, to support this task. Kindlmann and Durkin [6] introduced a semi-automatic approach for the visualization of boundaries between tissues. Pfister et al. [14] gave an overview on existing techniques to support the design task of transfer functions. The direct manipulation widgets introduced by Kniss et al. [8] can be used to find regions of interest in the multi-dimensional transfer function space in an intuitive and convenient way. In other work, Kniss et al. [9] describe a way to efficiently represent multi-dimensional transfer functions by Gaussian functions instead of storing a multi-dimensional lookup table.

It is an object of the invention to provide a method and an according apparatus for defining transfer functions in multimodal volume visualization, wherein the complexity of finding a good transfer function is reduced so that a transfer function can be defined by the user in an intuitive and familiar way.

This object is achieved by the method or the apparatus according to the independent claims.

The method according to the invention comprises the following steps: acquiring a first volume data set of the object with a first imaging modality and a second volume data set of the object with a second imaging modality, said first and second volume data set each comprising a plurality of sample points and values associated with said sample points, establishing a transfer function, said transfer function defining optical properties of certain values of said first and second volume data set, and visualizing the optical properties of said certain values of said first and second volume data set, wherein the transfer function is established by using information contained in a distribution of values of said first and second volume data set.

The apparatus according to the invention comprises a processing unit for establishing a transfer function, said transfer function defining optical properties of certain values of said first and second volume data set, and a display unit for visualizing the optical properties defined by the transfer function of said certain values of said first and second volume data set, wherein the processing unit is designed to establish the transfer function by using information contained in a distribution of values of said first and second volume data set.

The invention is based on the approach according to which the values of both modalities are fused by considering information which is contained in the probability distribution of values in both modalities. This results in a fused transfer function space with a single value and a single gradient magnitude as parameters. By this means, the complexity of finding a good transfer function is reduced significantly so that a transfer function can be defined by the user in an intuitive and familiar way.

In a preferred embodiment of the invention values of said first and second volume data set are fused based on the information contained in the distribution of these values resulting in a fused transfer function space comprising fused values and fused gradient magnitudes.

Preferably, fused values and fused gradient magnitudes of the fused transfer function space are displayed in a two-dimensional representation and a two-dimensional region of the two-dimensional representation of the fused transfer function space is selected by a user. In this embodiment a colour and an opacity is assigned to the selected two-dimensional region by the user.

In a particularly preferred embodiment opposite information parameters characterizing complementary information contained in the first and second volume data set are established by considering a joint probability for each tuple of values of said first and second volume data set. Preferably, the opposite information parameters are established by considering the distribution of values of said first and second volume data set. In these embodiments, a parameter range of the opposite information parameters can be selected by a user.

The term "complementary information" in the sense of the present invention means that there are sample points at which data acquired by a first imaging modality complement data acquired by a second imaging modality, e.g., when sample points are only represented in the data of the first imaging modality. Therefore, complementary information indicates a difference of information content in both modalities at each sample point. Accordingly, the opposite information parameters exhibit high values for regions with high opposite information content, i.e., for regions where information acquired by the first modality complements information acquired by the second modality.

By this means, as a measure for the complementary information of both modalities additional parameters are used giving the user more control over the visualization and leading to an even better separation of different tissues. In this embodiment, in addition to the probability distribution of values from the two volume data sets, additional parameters are used to better distinguish between tissues. These additional parameters are also retrieved by methods from information theory according to which the probability of occurrence of a signal can be used to define the information content of the signal, see e.g. Shannon [16] and Wells et al. [20].

It is also preferred that for each two-dimensional region of the two-dimensional representation of the fused transfer function space selected by the user a windowing function for the opposite information parameters is defined, and that the parameter range of the opposite information parameters is selected by the user by adapting the windowing function, in particular by adapting a position and/or a width of the windowing function. Preferably, for each opacity assigned to the selected two-dimensional region a modified opacity is derived considering the selected parameter range of the opposite information parameters.

It is possible for the user to select the parameter range of the opposite information parameters by simply choosing or adapting the windowing function, in particular by choosing a position and/or a width of the windowing function, without a prior display of the respective windowing function. Alternatively, it is also possible that at first a windowing function is displayed which is thereupon adapted by the user.

In a preferred embodiment of the apparatus according to the invention, the processing unit is designed so that values of said first and second volume data set are fused based on the information contained in the distribution of these values resulting in a fused transfer function space comprising fused values and fused gradient magnitudes.

Preferably, the display unit is designed to display fused values and fused gradient magnitudes of the fused transfer function space in a two-dimensional representation and wherein a user selection unit is provided, said user selection unit being designed so that a two-dimensional region of the displayed two-dimensional representation of the fused transfer function space can be selected by a user.

In another preferred embodiment of the invention the processing unit is designed so that opposite information parameters characterizing complementary information contained in the first and second volume data set are established by considering a joint probability for each tuple of values of said first and second volume data set.

Preferably, a user selection unit is provided, said user selection unit being designed so that a parameter range of the opposite information parameters can be selected by a user.

In the following, the invention is described in more detail referring to the figures.

Figures 3, 4:
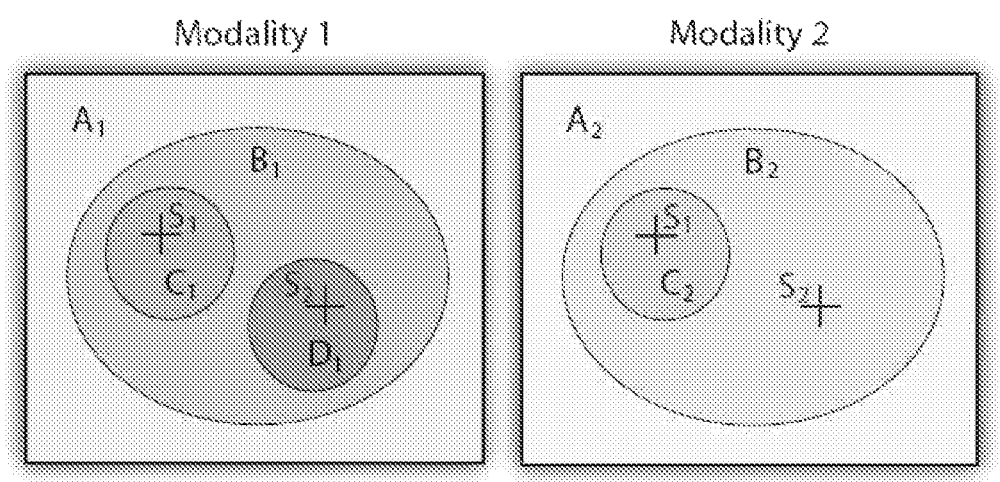
FIG. 3 shows a diagram exemplifying the relation between the probability of occurrence of a value in one modality and the γ value. The shade in the diagram indicates which modality has higher information for a given combination of values.

FIG. 4 shows an example of slices of two different modalities to explain how the δ value is affected by the value distribution. The regions with different shades indicate regions with different values in the modalities. S1 and S2 are sample points for which the δ value is calculated.

Figure 5:
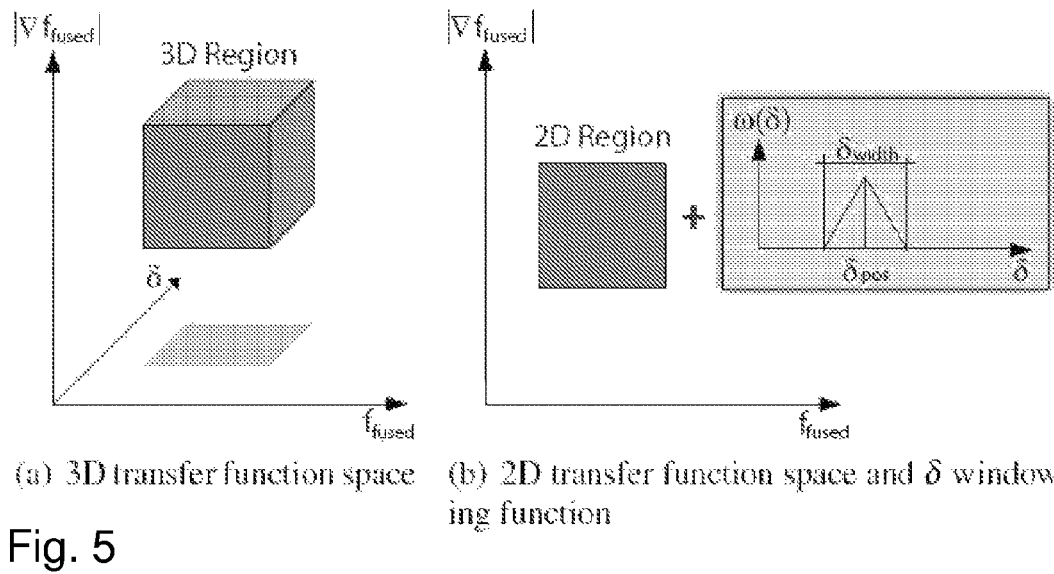

FIG. 5 shows an example where a transfer function space is converted from 3D (a) to 2D (b) and that a windowing function for the δ value is used to modify the optical properties of each 2D region.

Figure 6:
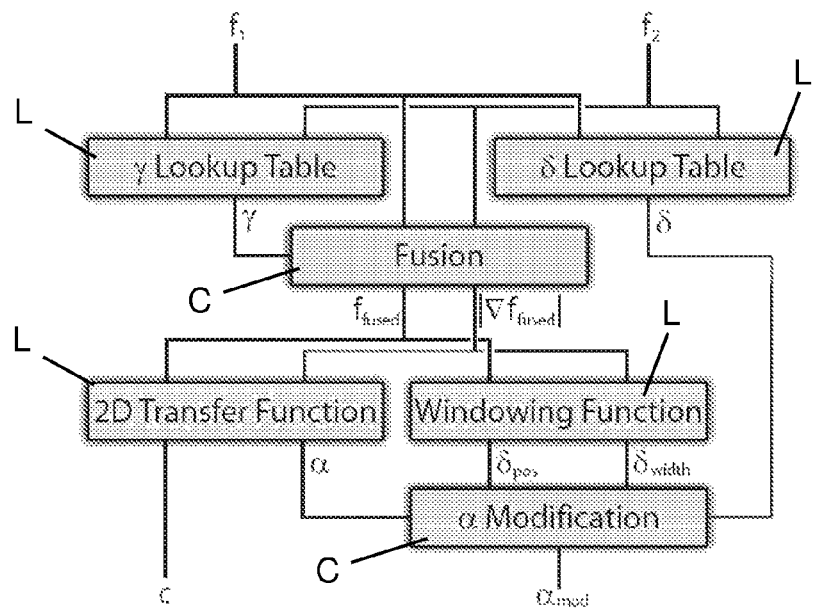

FIG. 6 shows an overview over the processing steps for each sample point during the rendering process. Nodes with reference letter "C" are calculation steps and nodes with reference letter "L" are lookups. The output of the processing pipeline is a color c and an opacity α.

Figure 7:
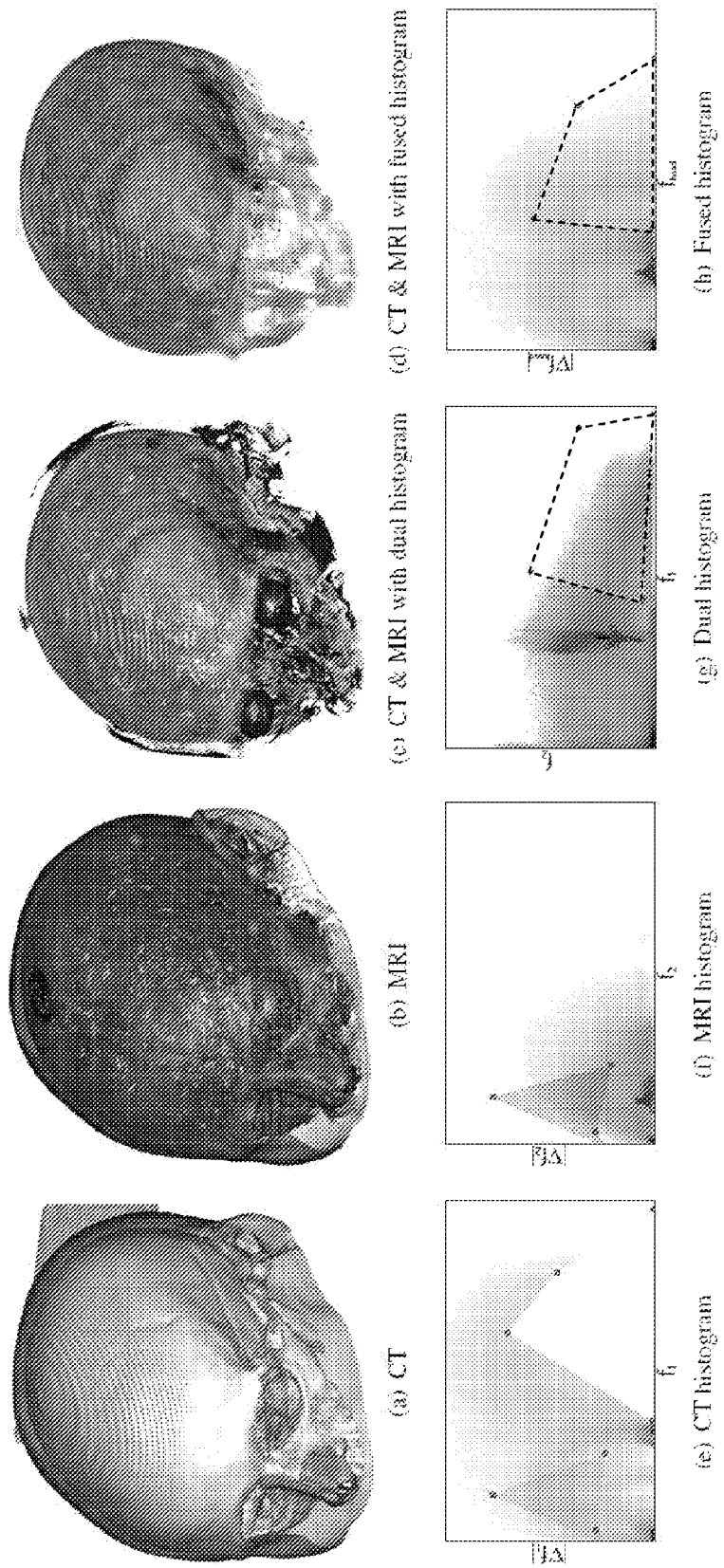

FIG. 7 shows images of single volume visualizations of CT data (a) and MRI data (b) in contrast to multimodal visualizations by using the dual transfer function space (c) and the fused transfer function space (d) according to the invention. Histograms (e)-(h) correspond with the above visualizations (a)-(d) and show 2D regions, see in particular dashed lines in (g) and (h), for the assignment of optical properties. The points in the histograms symbolize the vertices of the 2D regions.

Figure 8:
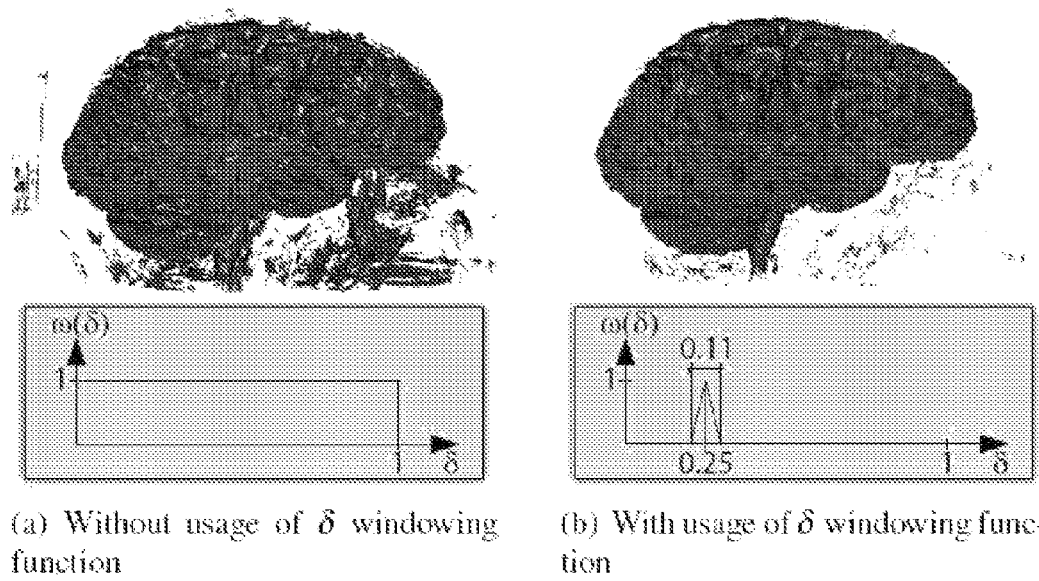

FIG. 8 shows the effect of the usage of δ to modify the optical properties of a 2D region in the transfer function space. For both results exactly the same 2D region was used.

Figure 9:
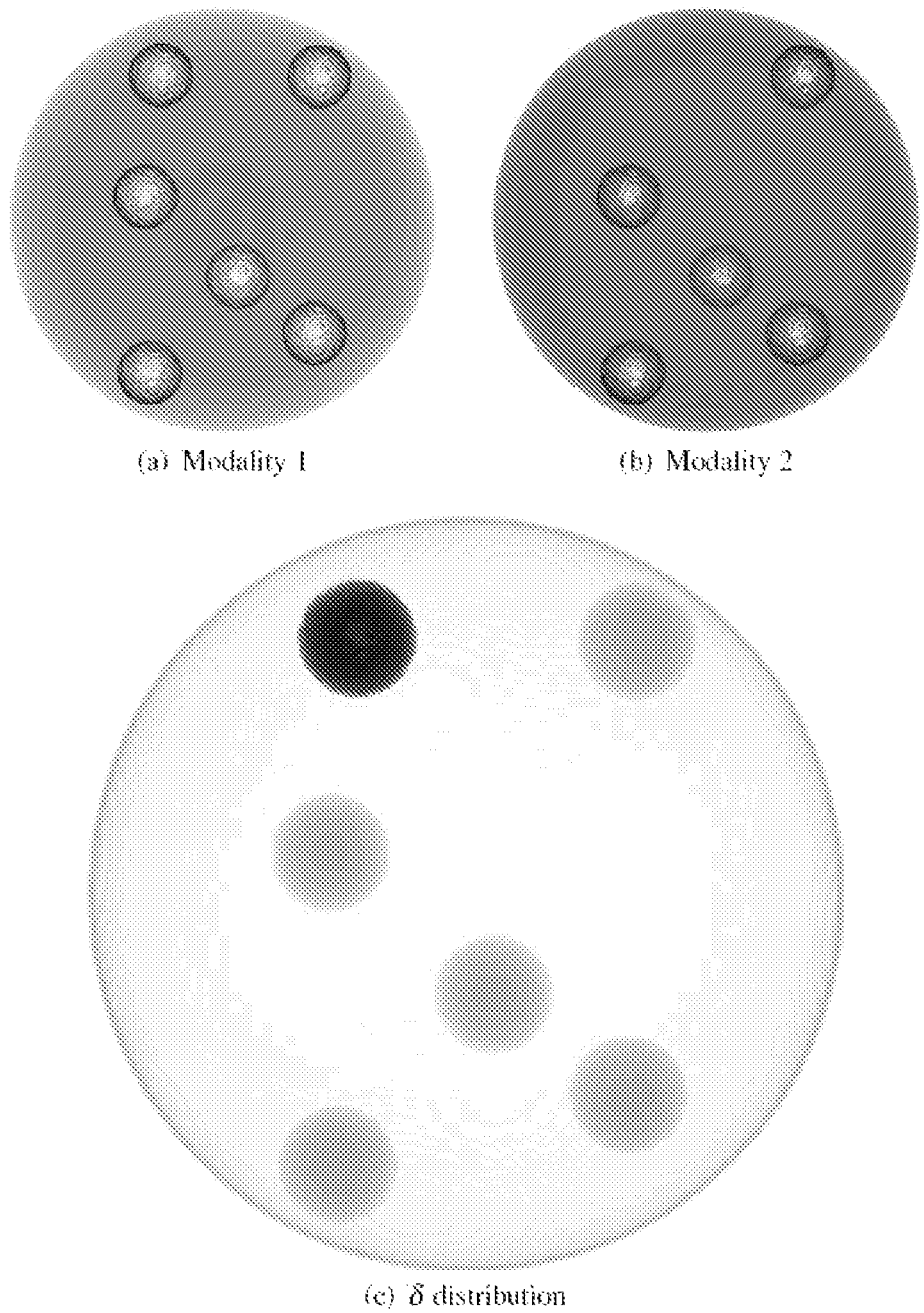

FIG. 9 shows an image (c) of the distribution of δ in volume space. It is highest in regions with the largest difference. In this case the largest difference occurs where in modality 1 (a) a sphere exists and in modality 2 (b) not.

Figure 10:
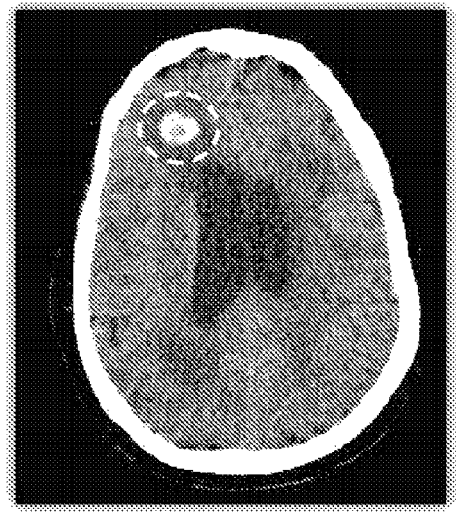
Figure 10:
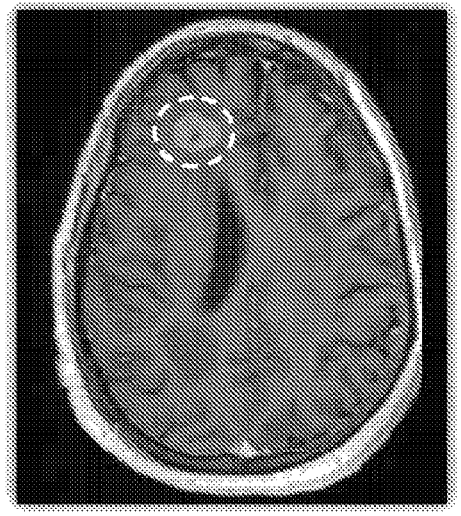
Figure 10:
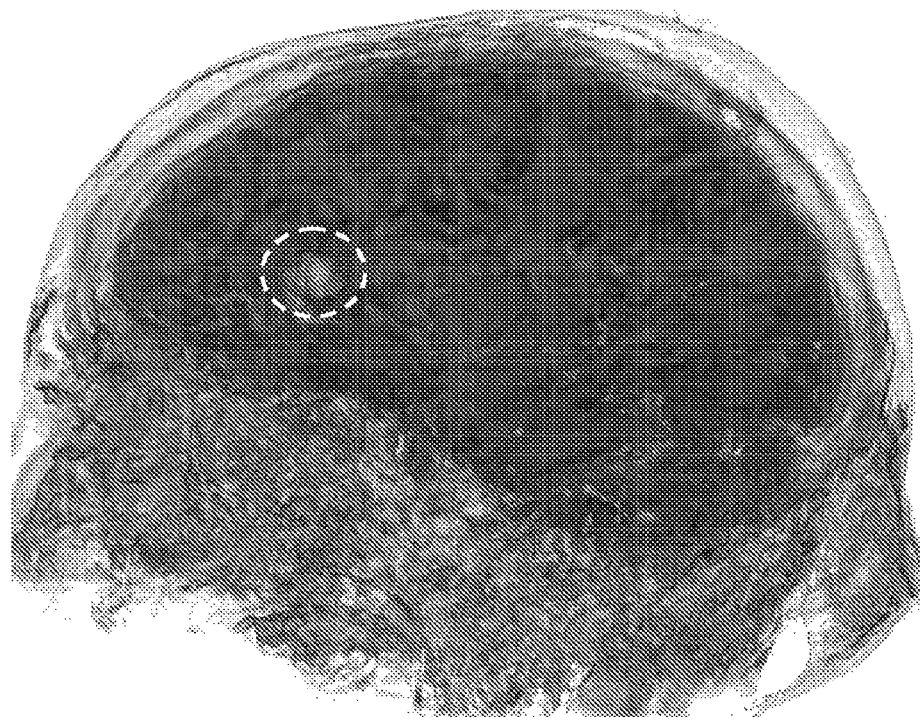

FIG. 10 shows that the multimodal rendering in (c) highlights a tumor in the brain, shown in the CT (a) and MRI (b) slice (see dashed lines). Through the δ value the segmentation of the tumor is made easy because this region has a higher δ value than other surrounding parts.

Figure 11:
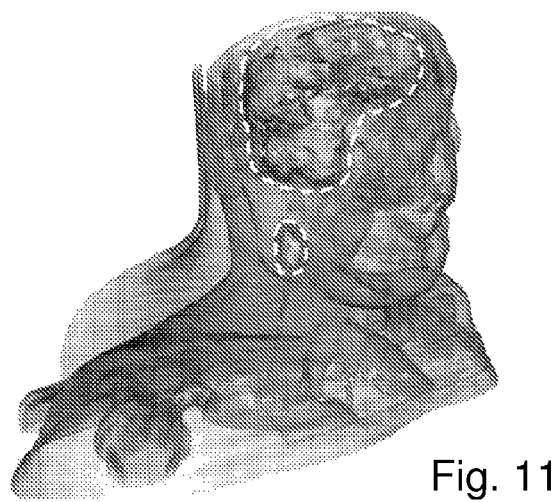

FIG. 11 shows a multimodal visualization of a CT and PET scan. The bright regions (see dashed lines) symbolize regions of high activity such as in the brain area and in the tumor on the neck.

Figure 12:
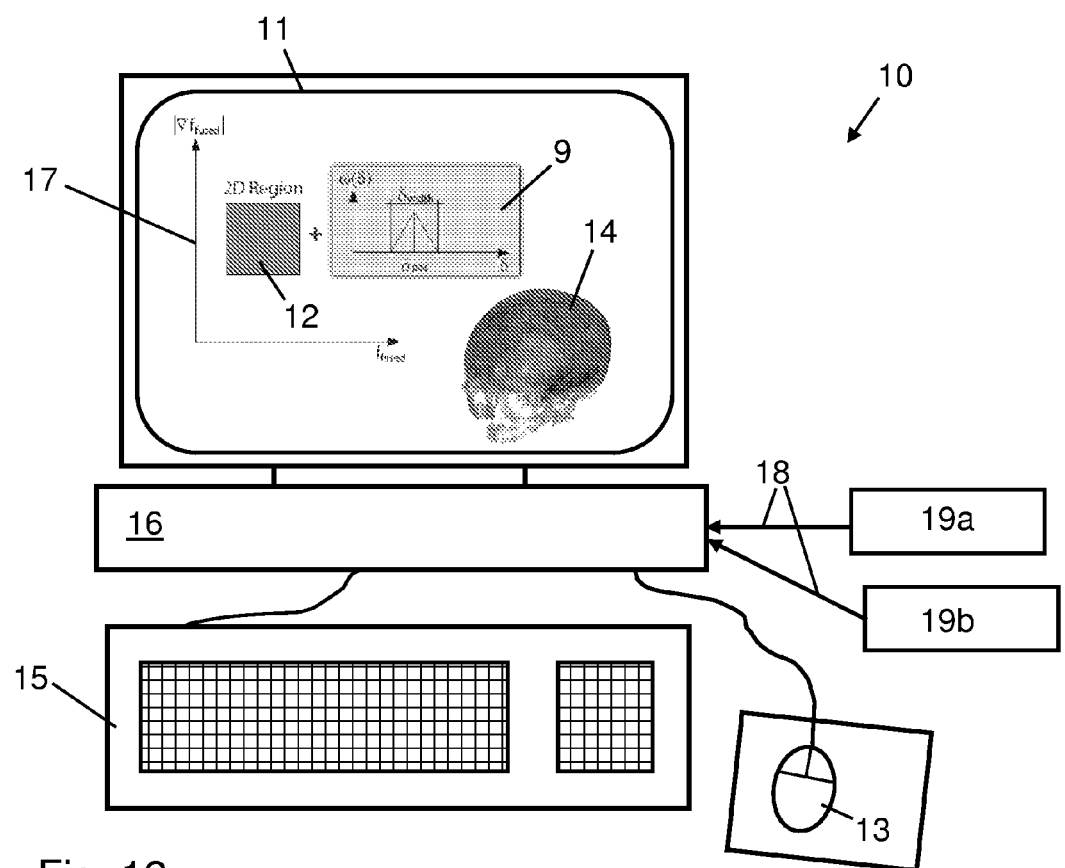

FIG. 12 shows an apparatus according to the invention.

INFORMATION-BASED TRANSFER FUNCTIONS FOR MULTIMODAL VISUALIZATION

In this section a novel transfer function space for multimodal visualization is introduced. The aim of all steps described herein is the design of a transfer function space which is as simple as possible but still is able to separate different tissues. One main aspect of the new approach is the use of methods from information theory for the design of this transfer function space.

Figure 1:
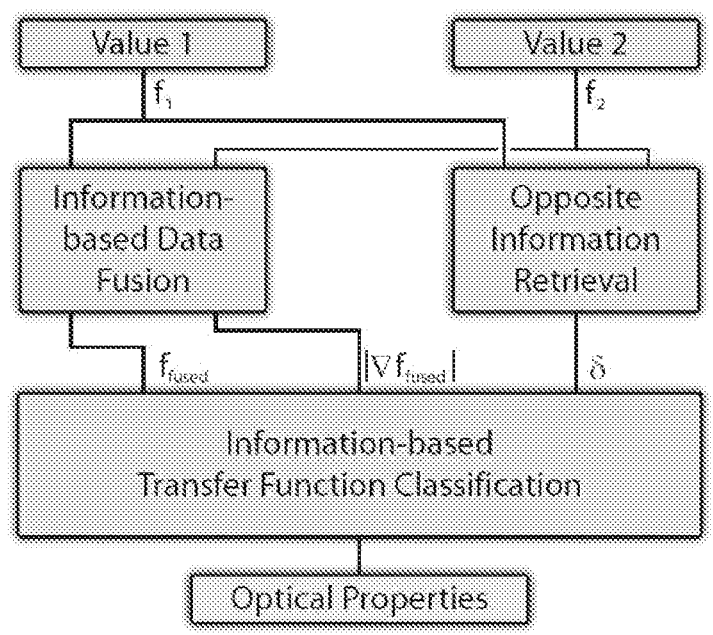
FIG. 1 shows a processing pipeline for the classification of sample points in a multimodal visualization by an information-based transfer function.

FIG. 1 shows all necessary processing steps to classify a tuple of input values $(f_1, f_2)$ in this new transfer function space with optical properties, wherein the transfer function space is defined by $f_{fused}$, $|\nabla f_{fused}|$ and δ.

In the following sections these processing steps will be described in detail, in particular how the input values can be fused to get just a single value for each pair of input values, how an additional property is used to refine the classification of different tissues through the transfer function and—finally—how the fused values are used to define the new transfer function space and how the additional property is used to influence the classification. For this purpose, methods from information theory taking into account the probabilities for the occurrence of certain values are used. In the following section it is described how these probabilities can be estimated.

Probabilities in Volume Data

Information theory, which is used for the new information-based approach, is a concept which quantifies the information content of a message. This quantification is based on the frequency of data. An example for the quantity of data can be found in a language. Each language consists of characters. The frequency of these characters is not equal. Some characters occur more often than others. This frequency measurement is the basis for information theory.

To apply the methods of information theory on volume data sets the value at a certain position inside the volume as discrete random variable has to be considered. Hence, the occurrence of a certain value is associated with a probability. Similar to characters in a language not all values occur with the same frequency and, therefore, the probability of their occurrence is different. The simplest way to estimate the probability of a certain value is done by counting its occurrence in the whole data set and by dividing this number by the total number of points in the volume. It is assumed that the volume is given as a set of regularly arranged grid points. To do this for all values a histogram is generated. In a histogram the count of a bin is increased if a value falls in the range of this bin. When the counted numbers for all bins are divided by the total number of points in the volume, we get a probability distribution P(f) which returns a probability of occurrence for each value f.

For retrieving the information content of the joint occurrence of two values from two modalities another probability distribution is needed. It returns a probability $P(f_1, f_2)$ for each tuple of values $f_1$ from a first modality and $f_2$ from a second modality, also referred to as joint probability. Equally to the probability for the occurrence of only one value this probability distribution can also be estimated by a histogram. Due to the dependency of two values, the histogram is defined in 2D. This histogram is often referred to as dual histogram.

Figure 2:
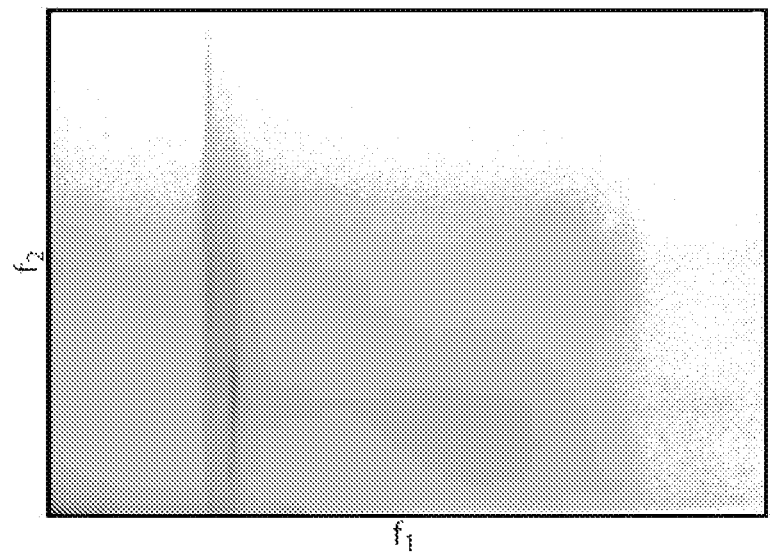
FIG. 2 shows an example of a dual histogram which is needed to estimate the joint probability distribution.

FIG. 2 shows an example of such a histogram. Dark regions in this histogram denote a higher probability as brighter regions and, therefore, these combinations of values occur more often. In the context of the joint probability $P(f_1,f_2)$ the probability of just a single value $P(f_1)$ is referred to as marginal probability.

These two types of probabilities are used in the following to generate a new transfer function space based on the methods of information theory.

Information-based Data Fusion

At some point in a multimodal visualization pipeline the information from both data sets has to be combined, as each sample point can only have one color and opacity. The idea behind the information-based data fusion is a fusion which loses as little as possible information. Information can be measured concerning the quality or the quantity of the data. To be measured by the quality, user interaction would be necessary to decide which region is important in which modality. This would be a good measurement but it is a time-consuming process and has to be repeated for each new data set.

A second way to measure the information is based on the quantity, i.e. frequency, of the data. For this measurement the methods of information theory are used. The idea behind this measurement is that values which occur very often have less information than values which occur not so often. For medical data sets this can be interpreted that larger regions with the same value, such as the background, contain less information than smaller regions, such as border areas or small tissues. The information content can be expressed by the following equation:

$$I(f) = -\log_2(P(f)) \qquad (1)$$

The probability $P(f)$ in this equation returns a probability of occurrence for a certain value f. Through the $\log_2$ function the information $I(f)$ is high for values with a low probability. This information content can be calculated for both values represented at a certain sample point. The fusion should then be done in a way to weight the value with more information content higher the value with less information content. The following equation describes a function which returns a single value which describes this weighting:

$$\gamma(f_1, f_2) = \frac{I(f_2)}{I(f_1) + I(f_2)} \qquad (2)$$

The $\gamma$ value is 0 when the second modality has no information. It is 1 if the first modality has no information. For a value of 0.5 both modalities contain the same amount of information for a given pair of values.

FIG. 3 shows an example where the $\gamma$ value is calculated for two modalities according to Equation 2. The values in the matrix represent the calculated $\gamma$ values for the given probability of both modalities, as shown on the left side and at the top. The background grayscale indicates which modality has more information for a pair of values. The saturation of the grayscale encodes the dominance of a modality.

With Equation 2 for each pair of values a number is derived which can directly be used for the weighting in the fusion step. The fusion of two values, $f_1$ and $f_2$, is simply done by the following equation:

$$f_{fused} = (1-\gamma)*f_1 + \gamma*f_2 \qquad (3)$$

The fused value $f_{fused}$ is close to the value of one modality when this modality contains more information than the other modality. Therefore, points with high information content in just one modality are only slightly modified in contrast to their original value. This property makes it easier to find such points in the new transfer function space because they have almost the same value as they would have in volume visualization of this modality alone. For points with almost the same information content in both modalities a new value is calculated which lies between the two original values.

The gradients of both modalities are fused in the same manner as the values:

$$\nabla f_{fused} = (1-\gamma)*\nabla f_1 + \gamma*\nabla f_2 \qquad (4)$$

The fusion of the gradients is needed for the shading calculation as well as for classification by the transfer function based on gradient magnitude. The result of the fusion is a single value for each sample point like for the visualization of a single volume. This fused value together with the magnitude of the fused gradient can be used for the classification by a transfer function.

Unfortunately some tissues are overlapping in this fused transfer function space. Therefore an additional parameter is introduced in the following section which supports the transfer function design for a better separation of different tissues.

Opposite Information Retrieval

In the previous section, with the $\gamma$ value, a quantity was calculated which indicates which of the two values has more information. In this section a quantity will be defined which indicates the information contained in the joint occurrence of two values rather than the information contained in the occurrence of a single value. This new quantity will be used as another attribute for the classification of a sample point with optical properties. The goal of the new attribute is to extract regions with high opposite information content from regions with almost the same information content in both modalities. For the classification with optical properties this property can be used for a better separation of different tissues.

For image and volume registration the maximization of the mutual information is a common tool to find a good registration position. In this context the best registration position is found when the mutual information is at a maximum. This means that in this position both data sets contain the lowest possible opposite information. The mutual information is a quantity for the whole data set.

In contrast, the point-wise mutual information (PMI) is a quantity for the mutual information for a certain combination of points. It is defined by the following equation:

$$PMI(f_1, f_2) = \log_2\left(\frac{P(f_1, f_2)}{P(f_1)*P(f_2)}\right) \qquad (5)$$

The PMI is 0 when a pair of values occurs exactly as frequently as one would expect by chance. This is the case when both values are statistically independent from each other and the joint probability $P(f_1,f_2)$ is exactly the product of both marginal probabilities $P(f_1)$ and $P(f_2)$. If they occur together more frequently as one would expect by chance then the result of the calculation is greater than 0. Conversely, the value is lower than 0 if a pair of values occurs less frequently as one would expect by chance. By the definition of Shannon this case contains more information than a result value greater than 0 because the occurrence is less frequent. For a joint probability $P(f_1,f_2)$ of 0 the PMI is by definition 0. For all other probabilities the PMI can be normalized to a value between 0 and 1 by subtracting the lower bound ($P(f_1)=1$ and $P(f_2)=1$) from the PMI and dividing it by the difference between the upper bound ($P(f_1)=P(f_1,f_2)$ and $P(f_2)=P(f_1,f_2)$) and the lower bound:

$$PMI_{norm}(f_1, f_2) = \frac{PMI(f_1, f_2) - \log_2(P(f_1, f_2))}{\log_2\left(\frac{1}{P(f_1, f_2)}\right) - \log_2(P(f_1, f_2))} \quad (6)$$

If this equation returns a value close to 0 then the pair of values has more information than if it would return a value close to 1. To get a high value for pairs of values with high information content we define a new quantity δ as an inversion of $PMI_{norm}$:

$$\delta(f_1,f_2)=1-PMI_{norm}(f_1,f_2) \quad (7)$$

FIG. 4 illustrates two slices of two different modalities. The different regions, labeled with capital letters, have different shades to symbolize regions of different values in both modalities. The crosses are sample points for which the δ value shall be calculated.

For the sample point S1 the involved marginal probabilities ($P(f_1)$ and $P(f_2)$) are rather low because only a small area (C1 and C2) has the same value in both modalities. For the sample point S2 the marginal probability in the second modality is higher because the sample point lies in a larger area B2. The joint probability $P(f_1, f_2)$ is the same for both sample points because the combination of C1 and C2 occurs exactly as often as the combination of D1 and B2. By calculating the δ values with these probabilities, however, a smaller value for the sample point S1 than for the sample point S2 is received.

This example can be interpreted in a way that for sample point S1 both modalities contain correlated information whereas for S2 modality 1 complements the information of modality 2 because the region D1 is only represented in modality 1. This means that the δ value responds with a high value for regions with high opposite information content. So this value can be used to separate tissues which only show up in one modality from tissues which are present in both modalities. It can be seen as a quantity which indicates the difference of information content in both modalities at each sample point. Noise in the data sets does not influence the δ value. It flattens the probability distribution function but the relation between the probabilities does not change and, therefore, the δ value is not affected.

The following section describes how this property can be integrated in the classification process.

Information-based Transfer Function Classification

In the previous two sections it was described how methods from information theory can be used to generate a fused value and fused gradient as well as an additional property δ which indicates the opposite information. These values together will be used now for the assignment of optical properties.

Due to the existence of three values ($f_{fused}$, $|\nabla f_{fused}|$, δ) for each sample point the classification could be done in a 3D space. For every triple of values optical properties would be assigned. This approach is shown in FIG. 5 (a). The problem with this approach is the complexity of the transfer function design. A 3D region for the assignment of certain optical properties is defined by a 3D position as well as an arbitrary 3D shape. With this degree of freedom for the definition of a 3D region it is hard to find a good transfer function.

Therefore, the degree of freedom is reduced by defining a region only in the 2D transfer function space ($f_{fused}$, $|\nabla f_{fused}|$). Additionally, for each region a simple windowing function is defined for the δ value. The selection of a windowing function for this task results from the fact that the δ values for points of one tissue are in a certain value range. To extract this tissue only points with a δ value in this range should be selected. A windowing function is easy to adjust to a certain value range. The windowing function can be expressed by the following equation:

$$\omega(\delta) = \max\left(\left|1 - \frac{\delta - \delta_{pos}}{0.5 * \delta_{width}}\right|, 0\right) \quad (8)$$

The parameters $\delta_{pos}$ and $\delta_{width}$ define the position and shape of the windowing function $\omega(\delta)$.

In FIG. 5 (b) the separation in a 2D region and an example for a corresponding windowing function is shown. The windowing function returns a value between 0 and 1. The original opacity α, assigned according to a 2D region in the transfer function space, is multiplied with this value to fade out points with a low return value of this windowing function.

The definition of a transfer function can be done in two steps. In a first step a region in the transfer function space is defined. In a second step the windowing function for the δ value can be adapted for a better separation of the tissue of interest. With this two-step approach the complexity of the transfer function design is reduced. The definition of a region in the fused 2D transfer function space is similar and thus well-known to the design of a 2D transfer function for single volume visualization.

Implementation

For a fast and efficient volume rendering it is necessary to do as many calculations as possible in a pre-process. The most time-consuming part of the whole process is the generation of the dual histogram and the two individual histograms of both modalities for the estimation of the probabilities.

This can be done before the rendering because the histograms are static for two given volume data sets and do not change during the rendering process. The histograms are used to calculate the γ and δ values as described in the previous section. Each of these values can be stored in a 2D lookup table. They also do not change for two given volume data sets.

FIG. 6 shows the processing steps for each sample point during the rendering process. The processing steps with reference letter "L" are lookups and the processing steps with reference letter "C" are calculations. As first step lookups in the a priori generated γ and δ lookup tables are done. The γ value is used to fuse the two input values as described above. With the fused value and the magnitude of the fused gradient a lookup in the lookup tables of the transfer function is done. One lookup table stores the color c and opacity α for each point in the transfer function space. The second lookup table stores the parameters $\delta_{pos}$ and $\delta_{width}$ of the windowing function. The color c of the 2D transfer function is directly used for further processing steps, such as shading. The opacity a is modified by the windowing function according to the parameters $\delta_{pos}$ and $\delta_{width}$ as well as the δ value. As output of this calculation step we get a modified opacity $\alpha_{mod}$.

The transfer function editor for the 2D transfer function is based on the work of Kniss et al. [8]. The user can define regions in the transfer function space and assign a color c and opacity α to these regions. The parameters for the windowing function for each region can be modified with an intuitive mouse interaction. The $\delta_{pos}$ value is changed by the movement of the mouse in vertical direction and the $\delta_{width}$ value by a movement in the horizontal direction. For each change of a region the lookup table for the transfer function and the windowing parameters have to be updated to directly see the result of the modification in the rendering result.

Results

In this section the combination of two different anatomical modalities is discussed.

The most common anatomical modalities are CT and MRI. CT is typically used to show bone structures. Soft tissues have a low contrast in CT data sets and cannot be displayed very well. For an MRI scan it is the other way around. Soft tissues, such as the brain, have a high contrast whereas bones cannot be seen.

In FIG. 7 (a) a visualization of a CT scan is shown and in FIG. 7 (b) the visualization of an MRI scan. Both visualizations are useful for special examinations but it can also be seen that both data sets contain some joint information. Furthermore some regions with less information, such as the tissue around the brain in the MRI scan, are hiding regions with more information, such as the brain itself.

The goal of a multimodal visualization is to combine relevant tissues from both modalities and show them together to provide additional context. The relevance of a tissue is dependent on the kind of examination. In a combination of CT and MRI of a head the brain could be the relevant part of the MRI scan and the bones could be the relevant parts of the CT scan.

FIG. 7 (c) shows the rendering results of a conventional multimodal visualization. The dual histogram space was used to define regions which assign optical properties to sample points. Both relevant tissues, the brain and the bones, are visible but also a lot of artifacts are visible in the result. This follows from the fact that the brain cannot be better separated in the transfer function space based on the dual histogram.

FIG. 7 (d) shows the result generated by the new method according to the invention. In comparison to the result generated with the conventional multimodal visualization technique the brain is clearly separated from other tissues and only a few artifacts are visible.

FIGS. 7 (e) to (h) show the corresponding histograms for the visualizations in FIGS. 7 (a) to (d). The regions which were used to classify sample points with optical properties, such as color and opacity, are also shown on top of these histograms. It can be seen that the regions for classifying the brain tissue and the bones in the new fused transfer function space, as shown in FIG. 7 (h), are highly related to the individual regions in the single modality visualizations, as shown in FIG. 7 (e) and FIG. 7 (f). The regions for the multimodal visualization, based on the dual histogram, are shown in FIG. 7 (g). The position and shape of the regions in this transfer function space are completely different in comparison to the regions for the single modality visualization. This makes it much harder for the user to define regions for the transfer function because the knowledge from the single modality visualization cannot be used.

As described above the definition of a transfer function is done in two steps. In FIG. 7 (h) only the regions are shown which assign a color and non-zero opacity to sample points. Furthermore for each of these regions a windowing function for the δ value is defined. This function is used to refine the separation by the transfer function.

In FIG. 8 (a) the rendering result is shown which is generated without the usage of a windowing function for δ. The region which is used to assign optical properties to the brain is the same as used for FIG. 7 (d). It can be seen that the result contains a lot of artifacts. In comparison to that FIG. 8 (b) shows a result which is generated by the additional usage of a windowing function for δ to modify the opacity. Through the refinement of the classification with the windowing function most of the artifacts are gone and the brain is clearly separated.

Besides the reduction of artifacts the strength of the additional δ value is the ability to find regions with high differences in both data sets. This can be very helpful for several applications, such as the finding of a tissue which only shows up in one modality. Due to the properties of δ as described above regions with opposite information in both data sets have a high δ value.

FIG. 9 shows the response of the δ value for the combination of two example data sets. In FIG. 9 (a) and FIG. 9 (b) two data sets are shown which only differ at one region where in modality 1 a sphere exists and in modality 2 not. FIG. 9 (c) shows the corresponding distribution of δ values for the two modalities. In the region where the sphere is represented in only one modality the δ value is the highest because this region contains a lot opposite information. This property can be used to easily find regions with a lot of opposite information in the two modalities. An example where this is useful is the detection of tumors in the brain. A tumor is a region which shows up with a high contrast in the MRI. The contrast in the CT scan is lower. Therefore, the region of the tumor contains a lot of opposite information. FIG. 10 (a) and FIG. 10 (b) show slices from a CT and MRI scan of a data set with a tumor in the brain. The tumor is the bright region in the top-left area of the brain. Due to the opposite information in this region the δ value is high. This can be used to easily find this region in the multimodal visualization by defining a region over the whole fused transfer function. The windowing function for δ is then adjusted in a way to show only points with a high value. When a region of interest is detected then the 2D region in the transfer function space can be minimized until it only covers the points with a high δ value. FIG. 10 (c) shows a result of the multimodal visualization which was generated in this way. The bright blob inside the brain is the tumor as shown in the slices above. The artifacts in this image result from the very bad registration of the two data sets in some regions. Nevertheless, the new technique is able to highlight the tumor without the need of a segmentation.

The results so far used only anatomical modalities for the multimodal visualization but it is also possible to combine anatomical modalities with functional modalities. This combination brings together the benefits from anatomical modalities, such as high spatial resolution and anatomical structures, with the benefits of functional modalities, such as depicting functional processes inside the body. For this combination already a lot of research has been done. Most of these approaches provide a 2D visualization where the anatomical information is overlaid with the functional information. Also 3D visualizations have been presented which clearly show the regions of high activity in contrast to the anatomical modality.

FIG. 11 shows a result of a multimodal visualization for the combination of these two modalities generated by the method according to the present invention. It shows a CT scan of the head together with a PET scan. The regions of high activity inside the brain and at the tumor in the neck were defined by 2D regions in the fused transfer function space together with a windowing function for δ and are visualized by bright regions.

The different results have shown how the new approach can be used for multimodal visualizations in different ways. In experiments, the fused transfer function space has proven to be an intuitive space for the design of a transfer function because it is similar to the transfer function space of single volume visualizations. Furthermore the widowing function for the δ value is an effective tool to better separate different tissues from both modalities and it can also be used to find regions with a lot of opposite information.

FIG. 12 shows a schematic representation of an example of an apparatus 10 for multimodal visualization of medical volume data sets according to the invention. Different volume data sets 18 of an object, in particular a patient, are generated by at least two different modalities 19a and 19b, e.g. a CT and a MRI apparatus, and are conveyed to the apparatus 10.

The apparatus 10 comprises a processing unit 16 for establishing a transfer function, said transfer function defining optical properties of certain values of the different volume data sets 18. According the invention, the processing unit 16 is designed to establish the transfer function by using information contained in a distribution of values of the different data sets 18 as described above in detail. In particular, the processing unit is designed to fuse values of said first and second volume data set considering information contained in the distribution of these values resulting in a fused transfer function space $(f_{fused}, \nabla f_{fused})$ comprising fused values $f_{fused}$ and fused gradient magnitudes $\nabla f_{fused}$.

Moreover, the apparatus comprises a display unit 11, e.g. a TFT screen, for displaying fused values $f_{fused}$ and fused gradient values $\nabla f_{fused}$ of the fused transfer function space $(f_{fused}, \nabla f_{fused})$ in a two-dimensional representation 17 and for displaying a multimodal visualization 14 based on the fused transfer function space $(f_{fused}, \nabla f_{fused})$. It is also possible to display a two-dimensional representation 9 of the windowing function $\omega(\delta)$ on the display unit 11.

The apparatus 10 comprises a user selection unit, e.g. a mouse 13 and/or a keyboard 15, enabling the user to select a two-dimensional region 12 of the displayed two-dimensional representation 17 of the fused transfer function space $(f_{fused}, \nabla f_{fused})$. Via the mouse 13 and/or the keyboard 15 it is also possible for a user to select a position $\delta_{pos}$ and/or a shape, e.g. a width $\delta_{width}$, of the windowing function $\omega(\delta)$.

CONCLUSION

By the invention described above a user-friendly transfer function space is obtained, which makes it easy to find an expressive transfer function in order to visualize certain tissues of both modalities.

Through the fusion of the data values based on the information content a 2D transfer function space is defined which is similar to a 2D transfer function space of single volume visualization with value and gradient magnitude as the two dimensions. Therefore, the distribution of points in this transfer function space is easier to understand by the user.

A δ value which describes the opposite information contained in a pair of values is used for a better separation of different tissues. The δ value would extend the transfer function space by one dimension to a 3D space. Optical properties could be assigned in this transfer function space by defining 3D regions. Due to the complexity of this task in three dimensions, a two-step approach is performed where a region is only defined in the 2D transfer function space over the fused value and the magnitude of the fused gradient. In a second step a simple windowing function is adapted for each 2D region to refine the selection and better separate different features. This separation in two steps reduces the complexity of the design task because the degree of freedom is reduced.

With the approach according to the invention structures in the volume can be seen in the 2D histogram of the fused values. These structures are a combination of the structures which are visible in the individual 2D histograms of both data sets. This gives the user a clue where to initially place regions in the transfer function space, especially when the user is already experienced with the 2D transfer function space for single volume rendering.

As shown above, with the new fused transfer function space it is easier to define a transfer function. Also different tissues can be better separated in comparison to the dual transfer function space. An even better separation can be achieved by the additional use of the δ value which is used to refine the classification.

In the examples given above, only two modalities as input sources were used, i.e. exactly two values are existent at every sample point. In general, the concept of the present invention is applicable for the visualization of a combination of an arbitrary number of modalities. Preferably, the dimension of the transfer function space should not increase with the increasing number of involved values at every sample point. So the data fusion has to be extended to fuse more than two values to a single new value. Moreover, the calculation of the opposite information has also to be adapted to return a single value which represents how complementary the information is for the combination of more than two values at a certain sample point.

REFERENCES

[1] H. Akiba and K.-L. Ma. A tri-space visualization interface for analyzing time-varying multivariate volume data. In Proceedings of Eurographics/IEEE VGTC Symposium on Visualization, pages 115-122, 2007.

[2] W. Cai and G. Sakas. Data intermixing and multi-volume rendering. In Computer Graphics Forum, volume 18, pages 359-368, 1999.

[3] A. Evans, S. Marrett, J. Torrescorzo, S. Ku, and L. Collins. MRI-PET correlation in three dimensions using a volume-of-interest (VOI) atlas. Journal of Cerebral Blood Flow and Metabolism, 11(2):A69-A78, 1991.

[4] H. Hong, J. Bae, H. Kye, and Y.-G. Shin. Efficient multimodality volume fusion using graphics hardware. In International Conference on Computational Science (3), pages 842-845, 2005.

[5] J. Kim, S. Eberl, and D. Feng. Visualizing dual-modality rendered volumes using a dual-lookup table transfer function. Computing in Science and Engineering, 9(1):20-25, 2007.

[6] G. Kindlmann and J. W. Durkin. Semi-automatic generation of transfer functions for direct volume rendering. In VVS '98: Proceedings of the 1998 IEEE Symposium on Volume Visualization, pages 79-86, 1998.

[7] J. Kniss, C. Hansen, M. Grenier, and T. Robinson. Volume rendering multivariate data to visualize meteorological simulations: a case study. In VISSYM '02: Proceedings of the symposium on Data Visualisation 2002, pages 189-195, 2002.

[8] J. Kniss, G. Kindlmann, and C. Hansen. Interactive volume rendering using multi-dimensional transfer functions and direct manipulation widgets. In VIS '01: Proceedings of the 12th IEEE Visualization 2001, pages 255-262, 2001.

[9] J. Kniss, S. Premoze, M. (kits, A. Lefohn, C. Hansen, and E. Praun. Gaussian transfer functions for multi-field volume visualization. In VIS '03: Proceedings of the 14th IEEE Visualization 2003, pages 65-72, 2003.

[10] J. Kniss, J. P. Schulze, U. Wssner, P. Winkler, U. Lang, and C. Hansen. Medical applications of multi-field volume rendering and VR techniques. In Proceedings of Eurographics/IEEE VGTC Symposium on Visualization, pages 249-254, 2004.

[11] D. Levin, X. Hu, K. Tan, S. Galhotra, C. Pelizzari, G. Chen, R. Beck, C. Chen, M. Cooper, and J. Mullan. The brain: integrated threedimensional display of MR and PET images. Radiology, 172:783-789, 1989.

[12] M. Levoy. Display of surfaces from volume data. IEEE Computer Graphics and Applications, 8(3):29-37, 1988.

[13] H. Li, B. S. Manjunath, and S. K. Mitra. Multisensor image fusion using the wavelet transform. Graphical Models and Image Processing, 57(3):235-245, 1995.

[14] H. Pfister, C. Bajaj, W. Schroeder, and G. Kindlmann. The transfer function bake-off. VIS '00: Proceedings of the 11th IEEE Visualization 2000, pages 523-526, 2000.

[15] L. Schad, R. Boesecke, W. Schlegel, G. Hartmann, V. Sturm, L. Strauss, and W. Lorenz. Three dimensional image correlation of CT, MR, and PET studies in radiotherapy treatment planning of brain tumors. Journal of Computer Assisted Tomography, 11(6):948-954, 1987.

[16] C. E. Shannon. A mathematical theory of communication. Bell System Technical Journal, 27:379-423,623-656, 1948.

[17] R. Stokking, K. J. Zuiderveld, H. E. Hulshoff Pol, and M. A. Viergever. SPECT/MRI visualization for frontal-lobe-damaged regions. Visualization in Bio-medical Computing 1994, 2359(1):282-290, 1994.

[18] A. Toet. Hierarchical image fusion. Machine Vision and Applications, 3(1):1-11, 1990.

[19] K. Weiss, S. Stiving, E. Herderick, J. Cornhill, and D. Chakeres. Hybrid color MR imaging display. American Journal of Roentgenology, 149(4):825-829, 1987.

W. M. Wells III, P. Viola, H. Atsumi, S. Nakajima, and R. Kikinis. Multimodal volume registration by maximization of mutual information. Medical Image Analysis, 1:35-51, 1996.

[21] K. J. Zuiderveld and M. A. Viergever. Multi-modal volume visualization using object-oriented methods. In VVS '94: Proceedings of the 1994 IEEE Symposium on Volume Visualization, pages 59-66, 1994.

The invention claimed is:

1. A method for multimodal visualization of volume data sets of an object, comprising:
    acquiring a first volume data set of the object with a first imaging modality and a second volume data set of the object with a second imaging modality, said first and second volume data set each comprising a plurality of sample points and values associated with said sample points,
    establishing a transfer function, said transfer function defining optical properties of certain values of said first and second volume data set by using information contained in a probability distribution of values of said first and second volume data set, the probability distribution corresponding to a distribution of probabilities for occurrences of the values of said first and second volume data set, and
    visualizing the optical properties of said certain values of said first and second volume data set.

2. The method according to claim 1, wherein the values of said first and second volume data set are fused based on the information contained in the probability distribution of these values resulting in a fused transfer function space comprising fused values and fused gradient magnitudes.

3. The method according to claim 2, wherein fused values and fused gradient magnitudes of the fused transfer function space are displayed in a two-dimensional representation.

4. The method according to claim 3, wherein a two-dimensional region of the two-dimensional representation of the fused transfer function space is selected by a user.

5. The method according to claim 4, wherein a colour and an opacity is assigned to the selected two-dimensional region by the user.

6. The method according to claim 5, wherein opposite information parameters characterizing complementary information contained in the first and second volume data set are established by considering a joint probability for each tuple of values of said first and second volume data set and for each opacity assigned to the selected two-dimensional region a modified opacity is derived considering the selected parameter range of the opposite information parameters.

7. The method according to claim 4, wherein opposite information parameters characterizing complementary information contained in the first and second volume data set are established by considering a joint probability for each tuple of values of said first and second volume data set and for each two-dimensional region of the two-dimensional representation of the fused transfer function space selected by a user, which selected a parameter range of the opposite information parameters, a windowing function for the opposite information parameters is defined, and wherein the parameter range of the opposite information parameters is selected by the user by adapting the windowing function, in particular by adapting a position and/or a width of the windowing function.

8. The method according to claim 1, wherein opposite information parameters characterizing complementary information contained in the first and second volume data set are established by considering a joint probability for each tuple of values of said first and second volume data set.

9. The method according to claim 8, wherein the opposite information parameters are established by considering the probability distribution of values of said first and second volume data set.

10. The method according to claim 8, wherein a parameter range of the opposite information parameters is selected by a user.

11. The method according to claim 1, further comprising characterizing an information content of regions in the first volume data set and/or the second volume data set based on the probability distributions of the values.

12. The method according to claim 11, wherein the first volume data set is fused with the second volume data set using a weighting based on the determined information content of the regions.

13. The method according to claim 1, wherein the probability distribution is determined by calculating occurrences of the values in the first and second volume data set and dividing a total number of occurrences for each of the values by a total number of values in the first and second volume data set.

14. The method according to claim 1, wherein the probability distribution is calculated for each tuple of values from said first volume data set and said second volume data set to generate a joint probability.

15. An apparatus for multimodal visualization of volume data sets of an object, wherein a first volume data set of the object was acquired with a first imaging modality and a second volume data set of the object was acquired with a second imaging modality, said first and second volume data set each comprising a plurality of sample points and values associated with said sample points, said apparatus comprising:
    a processing unit for establishing a transfer function, said transfer function defining optical properties of certain values of said first and second volume data set by using information contained in a probability distribution of values of said first and second volume data set, the probability distribution corresponding to a distribution of probabilities for occurrences of the values of said first and second volume data set, and a display unit for visualizing the optical properties defined by the transfer function of said certain values of said first and second volume data set.

16. An apparatus according to claim 15, wherein the processing unit is designed so that values of said first and second volume data set are fused based on the information contained in the probability distribution of these values resulting in a fused transfer function space comprising fused values and fused gradient magnitudes.

17. An apparatus according to claim 16, wherein the display unit is designed to display fused values and fused gradient magnitudes of the fused transfer function space in a two-dimensional representation and wherein a user selection unit is provided, said user selection unit being designed so that a two-dimensional region of the displayed two-dimensional representation of the fused transfer function space can be selected by a user.

18. An apparatus according to claim 15, wherein the processing unit is designed to establish opposite information parameters characterizing complementary information contained in the first and second volume data set by considering a joint probability for each tuple of values of said first and second volume data set.

19. An apparatus according to claim 18, wherein a user selection unit is provided, said user selection unit being designed so that a parameter range of the opposite information parameters can be selected by a user.

20. An apparatus according to claim 15, wherein the processing unit characterizes an information content of regions in the first volume data set and/or the second volume data set based on the probability distributions of the values.

21. The apparatus according to claim 20, wherein the first volume data set is fused with the second volume data set using a weighting based on the determined information content of the regions.

22. An apparatus according to claim 15, wherein the processing unit determines the probability distribution by calculating occurrences of the values in the first and second volume data set and dividing a total number of occurrences for each of the values by a total number of values in the first and second volume data set.

23. The apparatus according to claim 15, wherein the processing unit calculates the probability distribution for each tuple of values from said first volume data set and said second volume data set to generate a joint probability.

* * * * *